United States Patent
Müller

(10) Patent No.: US 8,793,018 B2
(45) Date of Patent: Jul. 29, 2014

(54) DATA PROCESSING SYSTEM FOR AN INDUSTRIAL ROBOT AND METHOD FOR MANAGING AVAILABLE RESOURCES THEREOF

(75) Inventor: Stefan Müller, Augsburg (DE)

(73) Assignee: Kuka Laboratories GmbH, Augsburg (DE)

(*) Notice: Subject to any disclaimer, the term of this patent is extended or adjusted under 35 U.S.C. 154(b) by 925 days.

(21) Appl. No.: 12/741,234

(22) PCT Filed: Oct. 29, 2008

(86) PCT No.: PCT/EP2008/064645
§ 371 (c)(1),
(2), (4) Date: Sep. 9, 2010

(87) PCT Pub. No.: WO2009/059918
PCT Pub. Date: May 14, 2009

(65) Prior Publication Data
US 2010/0324730 A1     Dec. 23, 2010

(30) Foreign Application Priority Data
Nov. 5, 2007   (DE) .......................... 10 2007 052 673

(51) Int. Cl.
*G05B 19/04* (2006.01)
(52) U.S. Cl.
USPC .............. 700/247; 700/248; 700/249; 901/50
(58) Field of Classification Search
None
See application file for complete search history.

(56) References Cited

U.S. PATENT DOCUMENTS

| | | | |
|---|---|---|---|
| 5,416,906 A * | 5/1995 | Mariani | 700/248 |
| 5,448,110 A * | 9/1995 | Tuttle et al. | 257/723 |
| 5,659,779 A * | 8/1997 | Laird et al. | 709/226 |
| 5,974,465 A * | 10/1999 | Wong | 709/234 |
| 6,901,074 B1 * | 5/2005 | Yamasaki | 370/400 |
| 7,272,144 B2 * | 9/2007 | Cloonan et al. | 370/395.42 |
| 7,415,321 B2 * | 8/2008 | Okazaki et al. | 700/245 |
| 7,684,324 B2 * | 3/2010 | Clark | 370/230 |
| 7,916,626 B2 * | 3/2011 | Smith et al. | 370/216 |
| 7,937,104 B2 * | 5/2011 | Lintula et al. | 455/525 |
| 2002/0021701 A1 * | 2/2002 | Lavian et al. | 370/401 |
| 2003/0219014 A1 * | 11/2003 | Kotabe et al. | 370/375 |
| 2006/0268701 A1 * | 11/2006 | Clark | 370/230 |
| 2008/0019388 A1 * | 1/2008 | Harmon et al. | 370/412 |

OTHER PUBLICATIONS

"Priority Scheduling in Switched Industrial Ethernet," Zhang et al, 2005 American Control Conference, pp. 3366-3370.
Z/OS V1R9.0 Migration (pp. 107-110).

* cited by examiner

*Primary Examiner* — Khoi Tran
*Assistant Examiner* — Bao Long T Nguyen
(74) *Attorney, Agent, or Firm* — Schiff Hardin LLP

(57) ABSTRACT

In a method and a computer system for controlling an industrial robot, multiple data packets are received by the computer system, each of the data packets having a destination address with different priority classes being associated therewith in advance by the computer system. A chronological association of tasks with the resources of the computer system is made for processing the individual received data packets, based on the relevant priority class of the destination address of a received data packet.

33 Claims, 6 Drawing Sheets

DATA PROCESSING SYSTEM FOR AN INDUSTRIAL ROBOT AND METHOD FOR MANAGING AVAILABLE RESOURCES THEREOF

BACKGROUND OF THE INVENTION

1. Field of the Invention

The invention concerns a method for administering available resources of a computer system, in particular a computer system provided for a controller of an industrial robot; and a computer system, in particular to control an industrial robot.

2. Description of the Prior Art

Industrial robots are manipulation machines that are equipped for independent manipulation of objects with appropriate tools and are programmable in multiple movement axes, in particular with regard to orientation, position and workflow. Industrial robots have a computer system (for example a control computer) that controls or regulates the movement of the movement axles.

If the computer system is, for example networked with additional computers (for example based on Ethernet), received data packets can then severely load the resources of the computer system, such that a reliable operation of the industrial robot is prevented. It is also possible that the operation of the industrial robot negatively affects the real-time properties of the processing of the data packets.

SUMMARY OF THE INVENTION

It is an object of the invention to provide an improved method for administering available resources of a computer system provided for a controller of an industrial robot.

It is an additional object of the invention to provide a computer system, in particular to control an industrial robot that is set up such that requirements for an improved administration of the available resources of the computer system are provided.

The object of the invention is achieved by a method to administer available resources, in particular of a computer system provided for a controller of an industrial robot, possessing the following method steps:

receive a number of data packets by means of a computer system, wherein each of the data packets possesses a destination address with which different priority classes are associated in advance by the computer system, and chronological association of tasks with resources of the computer system for processing of the individual received data packets based on the relevant priority class of the destination address of the received relevant data packet.

The object of the invention is also achieved via a computer system, in particular to control an industrial robot, possessing resources and an operating system to administer the resources, wherein the computer system is set up to receive data packets possessing destination addresses; wherein different priority classes are associated with the destination addresses in advance by the computer system; and the operating system chronologically associates the tasks with the resources for processing of the individual received data packets based on the relevant priority class of the destination address of the received, relevant data packet.

One task of an operating system in general is the administration of the available resources of the computer system, for example its process or processors, working memory or input/output devices. The chronological association (scheduling) of tasks with the resources also belongs to the administration of resources. A task is a process that runs at the lowermost system level of the computer system.

The computer system according to the invention and the method according to the invention is in particular provided to, among other things, control the industrial robot and its movement progress. As explained above, industrial robots are manipulation machines that are equipped for independent manipulation of objects with appropriate tools and are programmable in movement axes, in particular with regard to orientation, position and movement progression. The movements of the control axles are generally controlled by, for example, a control system, and specifically by a computer system according to the invention.

The computer system according to the invention is provided to receive the data packets. The data packets can in particular be Ethernet data packets. Ethernet is a data networking technology for local data networks, realized via a wired (or alternatively a wireless) connection, and enables data exchange in the form of data frames between all apparatuses connected to a local network. Ethernet is largely standardized in the IEEE 802.3 standard.

The data packets can in particular be designed for the running operation of the industrial robot, for example for its control, or can be designed for additional applications (for example to implement a query to the computer system, an archiving of data associated with the industrial robot).

Depending on the goal of the received data packets, it is necessary that these are processed as quickly as possible (in particular in real time) by the computer system according to the invention. This in particular applies to data packets that the industrial robot requires for the current control (generally for the current running operation). In contrast, the processing of other data packets (for example the addressed requesting of an archiving of data) is less time-critical.

In informatics, the terms "real time" and "model time" are differentiated. Real time concerns the time that workflows use up in the "real world". Conversely, model time by contrast concerns the run time that is self-administered by a computer program.

As used herein a real time-capable system means a system that must react to an event within a predetermined time frame. The predetermined time frame depends on the respective task that should be processed with real time and can, for example, be in the millisecond range (for example for fast digital control and/or regulation tasks) or even in the second range (for example for temperature regulation or fill level monitoring).

Sometimes a differentiation is made between soft and hard real time. In what is known as hard real time, exceeding the predetermined time frame means an error. Conversely, in what is known as soft real time the system normally executes the relevant inputs within the predetermined time frame, wherein in principle an isolated overrun of the predetermined time frame is possible and does not lead to an error.

The received data packets are respectively associated with a destination address. For example, the destination address is an IP destination address. At least one of the destination addresses can be associated with a subnet of the computer system. According to the invention, different priority classes were associated in advance with the individual destination addresses. It is thus possible for the operating system of the computer system according to the invention to associate specific priorities with the individual received data packets based on the priority classes of their destination addresses. The priority associated with the relevant received data packet thereby corresponds to the priority class of the destination address of this data packet. Due to the associated priorities, the data packets are processed with higher or lower ranking in that the operating system temporally associates the tasks with the resources for processing of the individual received data packets based on the relevant priority class.

In an embodiment, the computer system according to the invention is a real time system, meaning that the operating system of the computer system according to the invention is a real time operating system according to this variant.

Different processes can run simultaneously on the computer system. Due to the priority of the received data packets that is determined based on their destination addresses, the operating system can administer the computer system such that the received data packets are executed with different priority. Furthermore, it is not necessary to initially unpack received data packets, such that data packets with lower priority essentially do not need to be pre-processed in order to determine their priority. Unnecessary computing effort thus may be avoided.

According to this embodiment, the destination addresses consequently receive a special task priority in the scheduling of the real time operating system, whereby an implicit priority schematic of the processing of received data packets is enabled. The possibility is thereby provided to ensure the necessary fairness of the computer time distribution of the computer system to comply with real time categories.

According to one variant of the method according to the invention, received data packets are buffered in buffers associated with the destination addresses.

For example, if a buffer is full, according to one embodiment of the method according to the invention a received data packet or a data packet already stored in a corresponding buffer is discarded if the computer system receives a data packet, or has already received a data packet with whose destination address a higher priority class is associated, but this has not yet been processed. It is thus possible that the data packets whose target address is associated with the highest priority are reliably processed with the highest priority, in particular in real time.

According to one variant, the computer system according to the invention possesses a CPU to control the industrial robot, on which CPU run tasks associated with the control of the industrial robot and additional tasks.

In another embodiment of the method according to the invention and the computer system according to the invention, data packets are provided for the control of the industrial robot and/or data packets that allow an information exchange of the industrial robot with at least one additional industrial robot with the destination address of the highest priority class. It is thus possible to operate the industrial robot in real time in running operation by means of the computer system according to the invention, although the computer system also receives data packets that are as such unnecessary for the running operation during said running operation. This variant also allows the interaction of the industrial robot with one or more additional industrial robots in running operation for which the industrial robot controlled with the computer system according to the invention must process data packets in real time, which data packets originate from the at least one additional industrial robot.

In another variant of the method according to the invention, three different priority classes are provided. For example, in this case it can be provided that the destination address with the lowest priority class is provided for data packets whose processing is not time-critical, or which can if necessary remain unprocessed (or even be discarded) given a relatively severe utilization of the resources of the computer system. Data packets with these destination addresses are, for example, data packets that are provided for a data archiving, a configuration of the computer system and/or a diagnosis of the computer system.

Data packets with the target address of the middle priority class are, for example, associated with a control device that can be connected to the computer system. Such a control device is, for example, a hand-held programmer device with which the movement workflow of the industrial robot can be established, for example within the scope of a teach-in programming.

Data packets with the destination address of the highest priority class are, for example, designated for an information exchange of the industrial robot with additional industrial robots. It is thereby possible for multiple industrial robots to mutually execute a task, in which case an optimally fast information exchange between the industrial robots is necessary during the currently running operation so that the industrial robots can execute the task satisfactorily, in particular in real time.

For example, by means of this variant of the method according to the invention and the computer system according to the invention it is possible for operations that represent high-priority, cyclical (robot) tasks during the operation of the robot controller to be implemented such as, a) a continuous communication of non-real time data with subnets is enabled,
b) real time data can be exchanged with at least one additional industrial robot,
c) a field bus protocol with real time requirements can be driven (for example ProfiNet) and/or
d) optionally an additional I/O protocol with real time requirements can be operated.

In order to enable a subdivision into implicit real time classes, the communication stacks (data packets) associated with the data streams a)-d) can receive a "virtual driver" to bind to the underlying driver of the network controller (virtual interface). A separate, prioritizable task and "memory queues" for the processing of the data packets is thus associated with each "virtual driver", as well as a linked communication stack. Other designations for "queue" are, for example, "waiting list" or buffer. A more open (in terms of manipulation) real time task scheme, and one that is more suitable for a computer system to control an industrial robot for processing of the data packets in different classes, is thus created than would be realizable with existing technologies (for example IEEE 802.1p and related technologies such as IEEE 802.1Q).

A possible priority scheme (descending) could then be:
Priority 1: d)
Priority 2: b)
Priority 3: c)
Priority 4: a)

For example, an intermittently high data rate of non-real time data (a)—for example remote desktop, archiving—is processed with lower priority relative to real time data according to b)-d) and the robot control and is "queued". The data packets according to a) can, for example, even be discarded—for example via an adjustable threshold of the associated "memory queue"—in the event that the free computing time is currently required for high-priority tasks.

Given use of virtual interfaces, buffers and a real time operating system, the virtual network interfaces thus receive special task priorities (priority classes) in the scheduling of the real time operating system and prioritizable memory ranges for the processing of the data packets. It is accordingly possible to realize an implicit priority scheme of packet processing, and thus to enable the necessary fairness of the real time distribution to comply with real time categories.

This implicit priority scheme now primarily possesses the advantage—primarily in the realization of networks consisting of diverse and heterogeneous participant stations—that it does not necessarily require of the participant stations a specific tagging of the data packets to realize what is known as a "quality of service"; however, it can use this tagging (in the event that it is present) to improve a "quality of service". This implicit priority scheme additionally possesses the advantage (at the operating system side of the control of the industrial robot) that the software interfaces of the layer (which rests on the physical layer) for integration of suitable communication software do not need to be modified by the priority scheme, such that the standard interfaces of the operating system are maintained.

A "generic real time multiplexer" is created (in particular for an Ethernet communication) which is not necessarily dependent on the technologies such as "VLAN" and "Priority Tagging" and thus also does not contain their restrictions. "Generic" additionally means that its functional scope is modularly composed of the "virtual interface" elements, and these can be configured for various scenarios.

In particular, all additional relevant sub-functions can then be combined into a "generic real time multiplexer", in particular into a "generic Ethernet real time multiplexer" which can be operated together with a robot controller on a CPU core.

The computer system according to the invention can also possess a plurality of interfaces which are associated with different priorities and that are provided to receive the data packets, wherein the operating system chronologically associates the tasks with the resources (for processing of the individual received data packets based on the relevant priority class of the interface) that has received the relevant data packet.

The different priority classes are thus associated with the interfaces of these variants of the computer system according to the invention. It is thus possible for the operating system of the computer system according to the invention to associate specific priorities with the individual data packets received with the interfaces based on the priority classes. The priority associated with the relevant received data packet thereby corresponds to the priority class of the interface that this data packet receives. The data packets are processed with high or low priority based on the associated priorities, in that the operating system chronologically associates the tasks with the resources for processing the individual received data packets based on the relevant priority class.

The destination addresses can be associated with the individual interfaces, such that the data packets can be received by interfaces established in advance. Depending on the desired priority for processing of the data packets via the computer system according to the invention, it is accordingly possible to send the data packets to the desired interface by means of suitable addressing so that this data packet is processed by the computer system corresponding to the priority class of this interface.

The interfaces can, for example, be physical (but also virtual) interfaces. The virtual interfaces can, for example, be realized by means of a software code.

According to one variant of the method according to the invention, received data packets are buffered in buffers associated with the interfaces. Given the use of virtual interfaces in particular, it is accordingly possible, for example, that every virtual network interface receives a separate task priority (priority class) in the scheduling of the (real time) operating system as well as prioritizable memory ranges for the processing of the data packets.

For example, if a buffer is full, according to one embodiment of the method according to the invention a received data packet or a data packet already stored in the corresponding buffer is discarded if an interface with a higher priority class receives a data packet or has already received a data packet but this has not yet been executed. It is thus possible that the data packets that were received with the interface with the highest priority class are reliably processed with the highest priority, in particular in real time.

DESCRIPTION OF THE PREFERRED EMBODIMENTS

Figure 1:
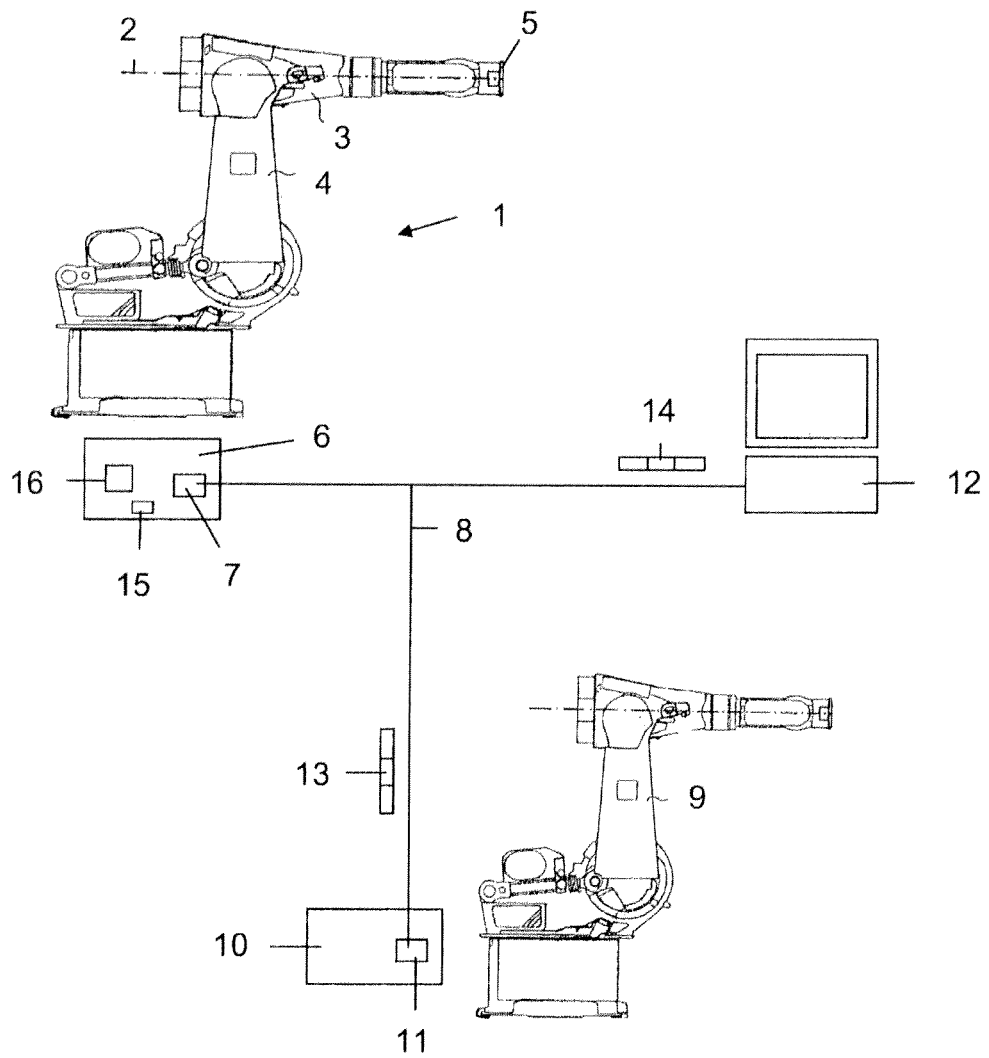
FIG. 1 multiple industrial robots with a control computer.

FIG. 1 shows a first industrial robot 1 with kinematics for movements in six degrees of freedom, for example. The first industrial robot 1 has (in a generally known manner) six movement axles, joints, arms 3, 4 and a flange 5. Only one of the movement axles is provided with the reference character 2 in FIG. 1.

Each of the movement axles 2 is moved by an actuator (not shown in detail). For example, each of the actuators respectively has an electrical motor and gearing as is generally known to those skilled in the art.

The industrial robots 1 also has a control computer 6 that is connected (the manner is not shown) with the actuators of the industrial robot 1 and controls these in a generally known manner by means of a computer program running on the control computer 6, such that the flange 5 of the industrial robot 1 implements a predetermined movement. A real time operating system (generally known to those skilled in the art) that administers the resources of the control computer 6 (for instance a process 16 or working memory; not shown in detail) runs on the control computer 6. The time association (scheduling) of active tasks with these resources also belongs among the administration of the resources.

In addition to the first industrial robot 1, FIG. 1 shows a second industrial robot 9 that—in the case of the present exemplary embodiment—is designed essentially like the first industrial robot 1 and has a control computer 10.

Figure 2:
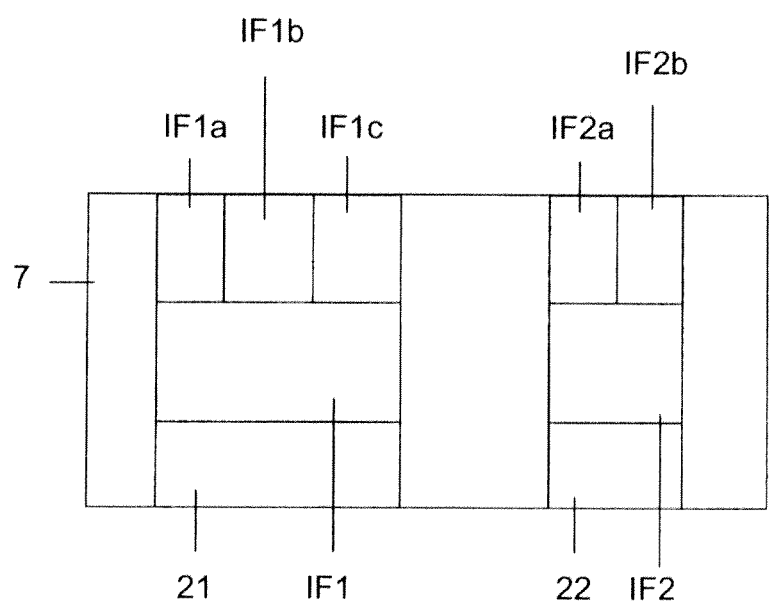
FIG. 2 shows an interface of one of the control computers.

In the present exemplary embodiment, the control computer 6 of the first industrial robot 1 possesses an interface 7 (shown in detail in FIG. 2), and the control computer 10 of the second industrial robot 9 possesses an interface 11 that resembles the interface 7 of the control computer 6.

In the present exemplary embodiment, the two control computers 6, 10 connect by means of the interfaces 7, 11 to an Ethernet 8 (as an example of a data network) and can communicate via the Ethernet 8 by means of data packets 13. Furthermore, a computer 12 on which a standard operating system runs is connected to the Ethernet 8. The computer 12 can likewise communicate with the two control computers 6, 10 via Ethernet 8 by means of data packets 14.

In the present exemplary embodiment, the interface 7 has a first network card 21 with a first physical interface IF1 and a second physical network card 22 with a second physical interface IF2, First, second and third virtual interfaces IF1a, IF1b, IF1c are realized with the first physical interface IF1, and fourth and fifth virtual interfaces IF2a, IF2b are realized with the second physical interface IF2.

During the operation of the first industrial robot 1, high-priority, cyclical robot tasks that the control computer 6 should preferably execute are associated with the tasks of the control computer 6 that are associated with the control of the industrial robot 1.

In the present exemplary embodiment it is additionally provided to enable a continuous communication with non-real time data to subnets (for example to the computer 12). This communication proceeds via the data packets 14. This communication is, for example, a query of a data archiving of the computer 12 to the control computer 6 of the first industrial robot 1, based on which the control computer 6 should transmit data for archiving to the computer 12. In the case of the present exemplary embodiment, this data exchange runs via the first virtual interface IF1a of the first network card 21.

In the present exemplary embodiment, it is also provided that the control computer 6 of the first industrial robot 1 exchanges data in real time with the control computer 10 of the second industrial robot 9 by means of the data packets 13. For example, this data exchange ensues via the second virtual interface IF1b of the first network card 21.

A field bus protocol with real time requirements (for example ProfiNet) is run via one of the virtual interfaces IF2a, IF2b of the second network card 22.

Optionally, an additional I/O protocol with real time requirements (for example EtherCat) can be operated, for example via the third virtual interface IF1c of the first network card 21.

The control computer 6 also has buffers 15 associated with the interfaces IF1a-IF1c, IF2a, IF2b, possibly to buffer received data packets 13, 14.

Furthermore, priority classes are associated with the five virtual interfaces IF1a-IF1c, IF2a, IF2b, based on which data packets 13, 14 received with the corresponding interface IF1a-IF1c, IF2a, IF2b are executed with different high priority by the control computer 6. In order to enable the subdivision in implicit priority classes, in the present exemplary embodiment the communication stacks associated with the aforementioned data streams receive a "virtual driver" for binding to the underlying driver of the network cards 21, 22. A separate prioritizable task and memory queues for the processing of the data packets 13, 14, as well as a linked communication stack, are thus associated with every "virtual driver".

In the present exemplary embodiment, the highest priority class is associated with the second virtual interface IF1b with which data packets 13 originating from the second industrial robot 9 are received, such that the control computer 6 of the first industrial robot 1 executes data packets received with this interface IF1b in real time.

In the present exemplary embodiment, the lowest priority class is associated with the first virtual interface IF1a with which the control computer 6 of the first industrial robot 1 receives the data packets 14 for the a query of a data archiving by the computer 12, for example. The control computer 6 accordingly executes these data packets 14 with lower priority, in particular in non-real time, and possibly discards received data packets 14 or data packets buffered by buffers 15 associated with the first virtual interface IF1a if the control computer 6 has to process or receives higher-priority data packets. Moreover, the control computer 6 can also be executed such that it interrupts the processing of a low-priority data packet (in particular a data packet that does not need to be executed in real time) in order to be able to provide more resources for the processing of a higher-priority data packet.

In the present exemplary embodiment, the highest priority is associated with the second virtual interface IF1b so that data packets received with this virtual interface IF1b (for example the data packet 13 originating from the second industrial robot 9) are processed with the highest priority.

In the present exemplary embodiment, a relatively high priority class is likewise associated with the fourth and fifth virtual interfaces IF2a, IF2b but it is lower than the priority class of the second interface IF1b. Data packets received with the fourth or fifth virtual interface IF2a, IF2b are likewise processed in real time, wherein the requirements for the predetermined time frame within which the control computer 6 must react to data packets received with these interfaces IF2a, IF2b are less strict than the requirements for the second virtual interface IF1b. This means that the time frames within which the control computer 6 reacts to data packets received with the second virtual interface IF1b is smaller than the time frame within which the control computer 6 reacts to data packets received with the fourth or fifth virtual interface IF2a, IF2b.

A higher priority is likewise associated with the third virtual interface IF1c with which the control computer 6 can optionally receive an additional I/O protocol with real time requirement, such that data packets received with this interface IF1c are likewise processed in real time. The real time requirements of the third interface IF1c is less than the real time requirements of the second virtual interface IF1b but greater than the real time requirements of the fourth and fifth interfaces IF2b, IF2c.

Figure 3:
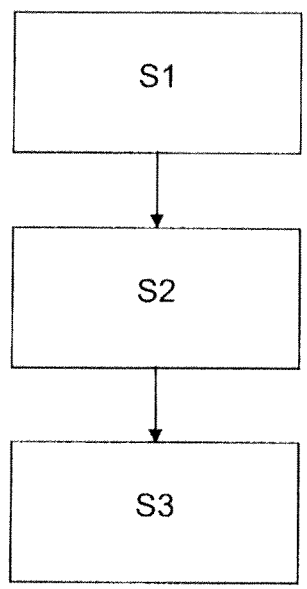
FIG. 3 is a flow diagram to administer available resources of one of the control computers.

A real time tasks scheme for processing of the data streams in different classes is thus created that is illustrated by means of a flow diagram shown in FIG. 3.

In operation of the first industrial robot 1, this receives multiple data packets 13, 14 by means of the virtual interfaces IF1a-IF1b, IF2a, IF2b, wherein different priority classes are associated with the interfaces IF1a-IF1b, IF2a, IF2b (Step S1 of the flow diagram).

The real time operating system of the control computer 6 associates chronological tasks with the resources of the control computer 6 for processing of the individual received data packets 13, 14 based on the relevant priority class of the interface IF1a-IF1b, IF2a, IF2b that has received the relevant data packet 13, 14 (Step S2).

If one of the interfaces of the control computer 6 receives a data packet with a lower priority class than an interface that likewise receives a data packet, it can also be provided that the data packet that is received with the interface with which the lower priority class is associated is discarded (Step S3 of the flow diagram).

Figure 4:
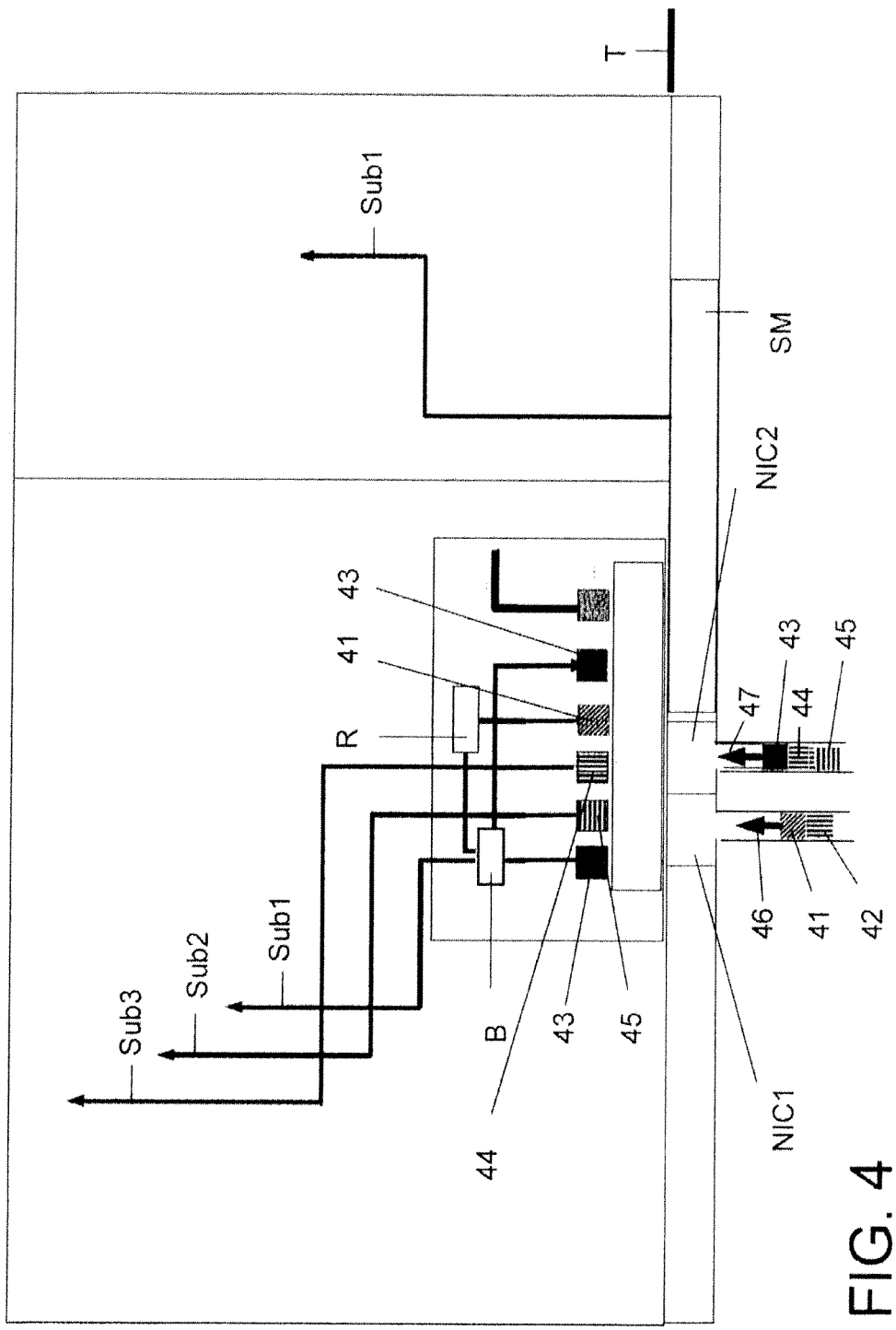
FIG. 4 is an additional drawing to illustrate the invention.

FIG. 4 shows an additional exemplary embodiment for controlling the industrial robot 1 that is explained as follows with reference to FIG. 4:

FIG. 4 shows data packets 41-45 that are sent via communication lines 46, 47 to network interface cards NIC1, NIC2 of the control computer 6 of the industrial robot 1. Each of the data packets 41-45 that has a valid destination address is subjected in the control computer 6 (by means of the destination address located in the data packet header of the relevant data packet 41-45) to a prioritization mechanism uniquely associated with the respective destination address range.

In the case of the present exemplary embodiment, the data packet 43 has the destination address range "Dest.: IP address space A", the data packet 44 has the destination address range "Dest.: IP address space B", the data packet 45 has the destination address range "Dest.: IP address space C", the data packet 41 has the destination address range "Dest.: IP address space D" and the data packet 42 has the destination address range "Dest.: Raw Ethernet address space".

The (standardized) data packet communication and the prioritization of the data packets 41-45 in the control computer 6 are combined in this way so that each communication participant on the network can participate in the prioritization solely by supporting the valid addressing scheme.

The communication mechanism illustrated in FIG. 4 is based on the use of what are known as "virtual network drivers" which can be linked in a standardized form to a TCP/IP stack with specification of an in particular address. The communication functions are extended by prevalent mechanisms, such as a learning bridge B and a NAT router R. After activation, a learning bridge builds automatic address tables and thus spares the network manager the manual application of tables. NAT is the abbreviation for "network address translation" and, in a computer network, is the collective term for methods in order to automatically and transparently replace address information in data packets with different address information. The design pattern of a switch (software switch) thereby approximately results.

The prioritization mechanism hereby ensures that, for example, the arriving data packet 43 with the addressing range "Dest.: IP address space A" is, after delivery to a packet buffer memory of the control computer 6, not additionally processed there until the data packet 44 has been completely elevated to the corresponding application (for example "real time application").

In principle this mechanism applies for all combinations of received data packets 41-45 and thus seamlessly inserts different subnets Sub1, Sub2, Sub3 into the entire tasking scheme of the control computer 6 and the requirement profile with regard to the operation.

For example, a subnet Sub1 in which a non-real time operating system is located, for example, simply ranges between the non-real time operating system of the subnet Sub1 and the real time operating system via the learning bridge B and an exchange memory range SM ("shared memory").

An additional access to this subnet Sub1 is achieved by means of the NAT router R.

It is clear that the communication in this subnet Sub1 is always throttled as soon as higher-grade communication tasks and higher-grade control tasks accumulate.

Tasks that do not need to be processed in real time are associated with the subnet Sub1. The (IP) destination address range "IP address space A" is associated with the subnet Sub1, the (IP) destination address range "IP address space B" is associated with the subnet Sub2, the (IP) destination address range "address space C" is associated with the subnet Sub3. The "address space C" can contain an address scheme deviating from IP, for example EtherCAT.

FIG. 4 schematically shows the insertion of communication tasks of different priorities (real time task (subnet Sub3) [prio 50], soft real time task (subnet Sub2) [prio 145], non-real time task (subnet Sub1) [prio 200]) into the tasking scheme of the control computer 6. In the case of the present exemplary embodiment, the priorities [prio 100-144] are associated with cyclical robot tasks and the priorities [prio 146-175] are associated with the acyclical robot tasks.

Real time, soft real time and non-real time are hereby classifications of this implicitly acting prioritization mechanism; cyclical robot tasks and acyclical robot tasks illustrate the task scheme of the robot controller as such.

The two operating system contexts (real time and non-real time operating system) are operated on a PC; a dividing line T indicates that the prioritization and communication are realized in software.

The interconnection of the bridge B and the router R utilizes the underlying prioritization scheme and ultimately allows the access to the subnet Sub1 both by the network interface card NIC1 and by the network interface card NIC2, wherein the access to the subnet Sub1 over the network interface card NIC1 ensues via the router R, such that this access is only activated via specific authorizations. A typical access via the network interface card NIC1 is, for example, via a corporate network.

Figure 5A:
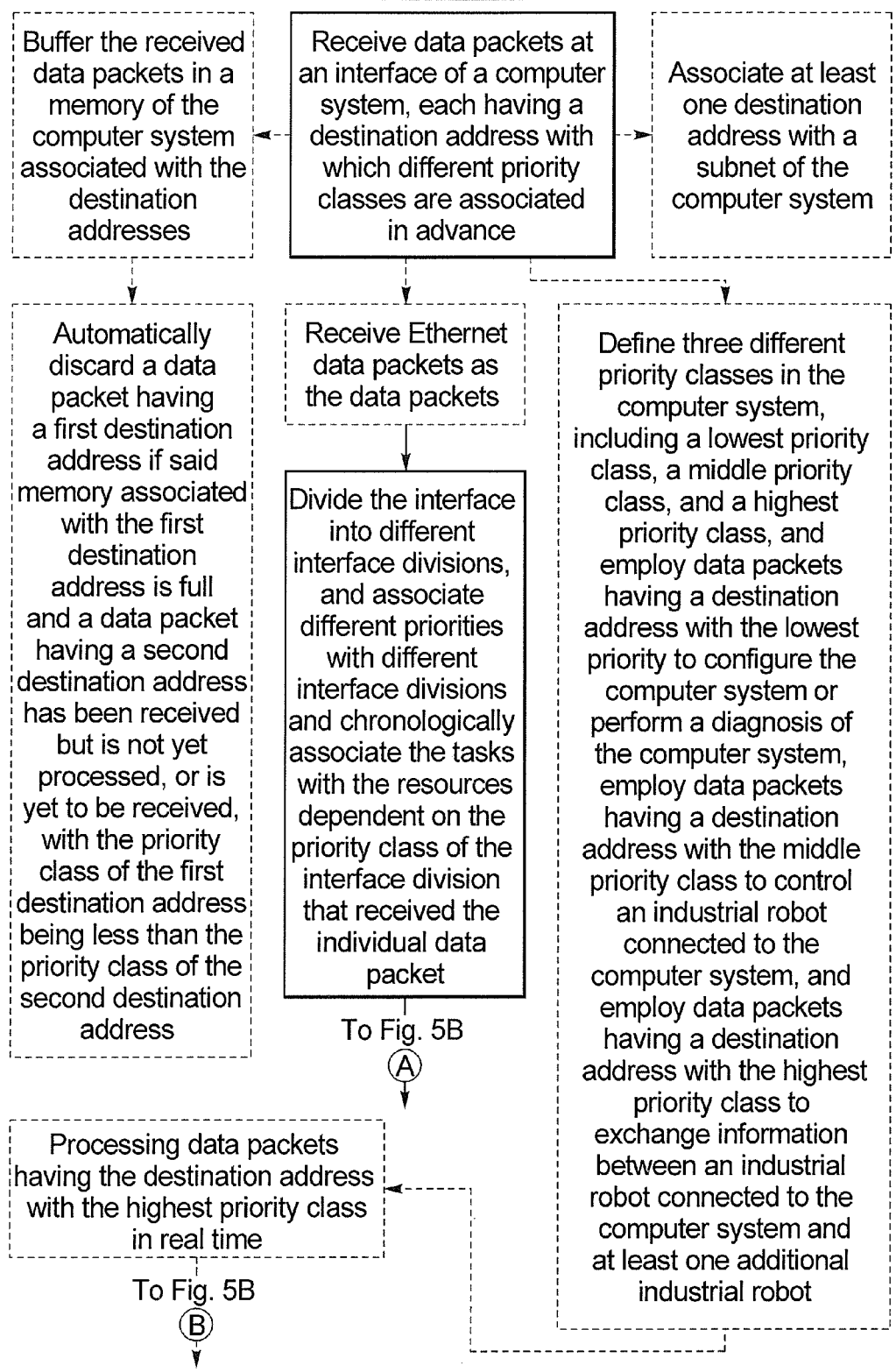
FIGS. 5A and 5B, in combination, are a flow chart for embodiments of the method according to the invention.
Figure 5B:
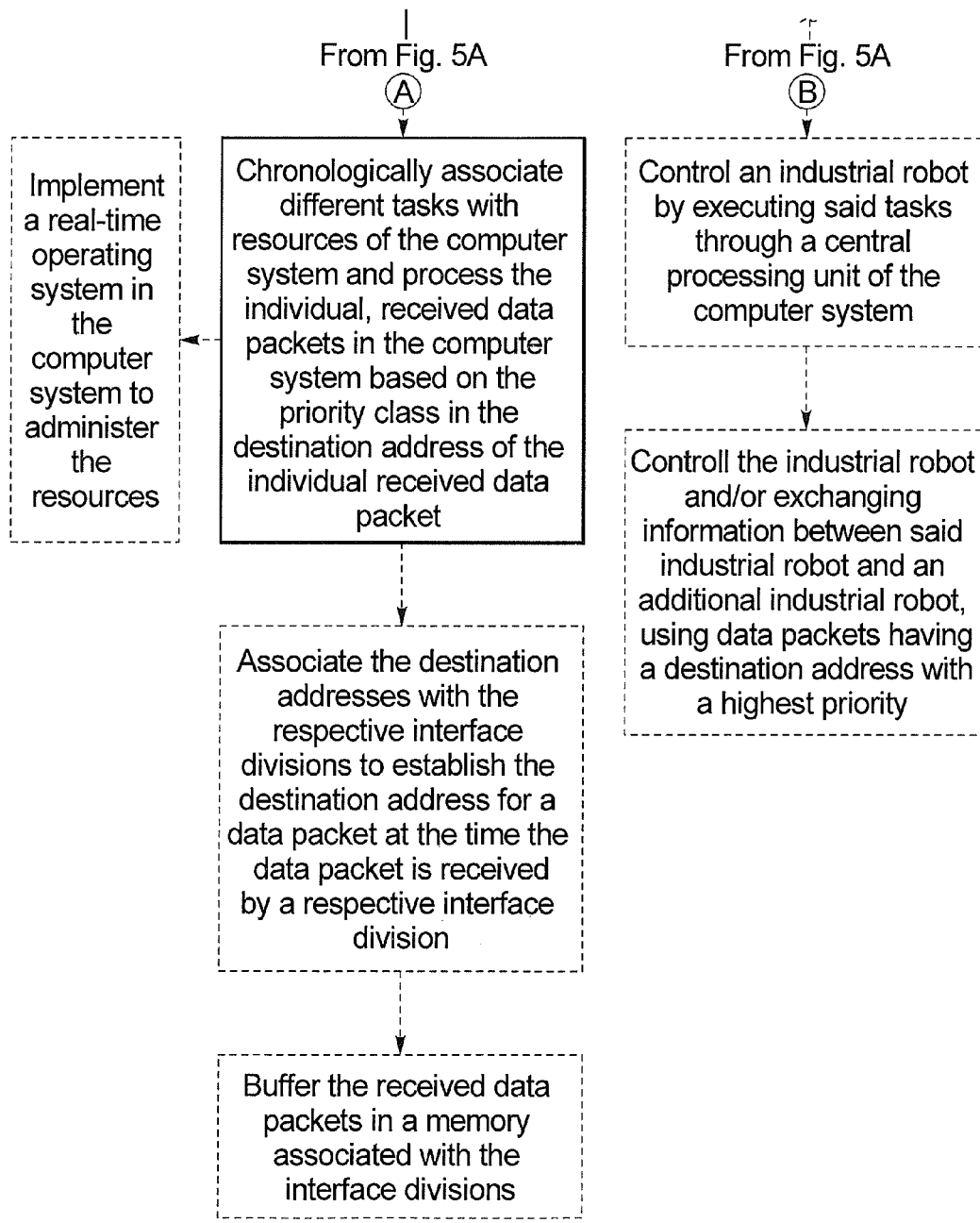

FIGS. 5A and 5B, in combination, show the steps in more detail of embodiments of the present invention, wherein optional steps are indicated by dashed lines.

Although modifications and changes may be suggested by those skilled in the art, it is the intention of the inventor to embody within the patent warranted hereon all changes and modifications as reasonably and properly come within the scope of his or her contribution to the art.

I claim as my invention:

1. A method to operate a computer system, comprising:
   in a computer system having a plurality of respective interfaces, assigning each respective interface a priority level, from among a plurality of priority levels ranked from a lowest priority level to a highest priority level in a hierarchy of time-criticality for performing respective tasks among a plurality of tasks performable by said computer system, with the lowest priority level in said hierarchy designating a task, among said plurality of tasks, with a lowest time-criticality for performance thereof and the highest priority level designating a task, among said plurality of tasks, with a highest time-criticality for performance thereof;
   via the respective interfaces, individually receiving incoming data packets that originate externally of said computer system, and automatically assigning each incoming data packet a priority level equal to the priority level of the respective interface at which that incoming data packet was received;
   in said computer system, giving each incoming data packet a destination address that causes that data packet to be transferred to a destination in said computer system designated by the destination address; and
   processing the respective data packets at said respective destinations in said computer system in a chronological order that is dependent on the respective destination to which the respective data packets have been transferred.

2. A method as claimed in claim 1 comprising assigning at least one destination address with a subnet of the computer system.

3. A method as claimed in claim 1 comprising buffering the respective, received data packets in respective memories of the computer system, each assigned to a respective destination address.

4. A method as claimed in claim 3 comprising automatically discarding a data packet having a first destination address if a respective memory assigned to the first destination address is full and a data packet having a second destination address has been received but is not yet processed, or is yet to be received, with said priority class of the first destination address being less than the priority class of the second destination address.

5. A method as claimed in claim 1 comprising receiving Ethernet data packets as the data packets received by the computer system.

6. A method as claimed in claim 1 wherein said computer system comprises a central processing unit configured to control an industrial robot, and executing said tasks through said central processing unit to control the industrial robot therewith.

7. A method as claimed in claim 6 comprising controlling said industrial robot and/or exchanging information between said industrial robot and an additional industrial robot, using data packets having a destination address with a highest priority.

8. A method as claimed in claim 7 comprising defining three different priority classes in said computer system, said three different priority classes comprising said lowest priority class, a middle priority class, and said highest priority class, and employing data packets having a destination address with said lowest priority, in a configuration task among said plurality of tasks, to configure the computer system or perform a diagnosis of the computer system, employing data packets having a destination address with said middle priority class, in a control task among said plurality of tasks, to control said industrial robot, and employing data packets having a destination address with said highest priority class, in an information exchange task among said plurality of tasks, to exchange information between said industrial robot and said additional industrial robot.

9. A method as claimed in claim 8 comprising processing data packets having said destination address with said highest priority class in real time.

10. A method as claimed in claim 7 comprising forming said plurality of interfaces by dividing one interface into three interface divisions and assigning three different priority classes respectively to the three interface divisions, and defining said three different priority classes as a lowest priority class, a middle priority class, and a highest priority class, and receiving data packets at a first of said interface divisions with said lowest priority class for data archiving, configuring said computer system, and diagnosing said computer system, receiving data packets at a second of said interface divisions with the middle priority class for controlling said industrial robot, and receiving data packets at a third of said interface divisions with the highest priority for information exchange with said industrial robot and said additional industrial robot.

11. A method as claimed in claim 10 comprising processing data packets received by said interface division with the highest priority class in real time.

12. A method as claimed in claim 1 comprising implementing a real-time operating system in said computer system to administer said resources.

13. A method as claimed in claim 1 comprising assigning a respective destination address to a respective interface to establish the destination address for a data packet at the time the data packet is received by that respective interface.

14. A method as claimed in claim 13 comprising buffering the respective, received data packets in respective memories respectively assigned to the respective interface.

15. A method as claimed in claim 14 comprising discarding a data packet received by a first interface among said plurality of interfaces when the respective memory assigned to the first interface is full and a data packet that was received by a second interface, among said plurality of interfaces, and is still to be processed or still to be received, with the priority class of the first interface being less than the priority class of the second interface.

16. A method as claimed in claim 1 comprising forming said plurality of interfaces from the group consisting of virtual interface divisions of one interface, and physically separate interfaces.

17. A computer system comprising:
a computer comprising a plurality of interfaces;
said computer being configured to assign each respective interface a priority level, from among a plurality of priority levels ranked from a lowest priority level to a highest priority level in a hierarchy of time-criticality for performing respective tasks among a plurality of tasks performable by said computer system, with the lowest priority level in said hierarchy designating a task, among said plurality of tasks, with a lowest time-criticality for performance thereof and the highest priority level designating a task, among said plurality of tasks, with a highest time-criticality for performance thereof;
the respective interfaces being configured to individually receive incoming data packets that originate externally of said computer system, and to automatically assign each incoming data packet a priority level equal to the priority level of the respective interface at which that incoming data packet was received;
said computer, via the respective interfaces, being configured to give each incoming data packet a destination address that causes that data packet to be transferred to a destination in said computer system designated by the destination address; and
said computer being configured to process the respective data packets at said respective destinations in said computer system in a chronological order that is dependent on the respective destination to which the respective data packets have been transferred.

18. A system as claimed in claim 17 wherein said computer is configured to assign at least one destination address with a subnet of the computer.

19. A system as claimed in claim 17 comprising respective memories in which the respective, received data packets assigned to a respective destination address are buffered.

20. A system as claimed in claim 17 wherein said computer is configured to automatically discard a data packet having a first destination address if the respective memory associated with the first destination address is full and a data packet having a second destination address has been received but is not yet processed, or is yet to be received, with said priority class of the first destination address being less than the priority class of the second destination address.

21. A system as claimed in claim 17 wherein said computer is configured to receive Ethernet data packets as the data packets received by the computer.

22. A system as claimed in claim 17 wherein said computer is part of a central processing unit configured to control an industrial robot to execute said tasks.

23. A system as claimed in claim 17 wherein said central processing unit is configured to control said industrial robot and/or exchange information between said industrial robot and an additional industrial robot, using data packets having a destination address with a highest priority.

24. A system as claimed in claim 17 wherein said computer is configured to implement a real-time operating system in said computer to administer said resources.

25. A system as claimed in claim 17 wherein said computer is configured to define three different priority classes, said three different priority classes comprising a lowest priority class, a middle priority class, and a highest priority class, and to employ data packets having a destination address with said lowest priority to configure the computer or perform a diagnosis of the computer, to employ data packets having a destination address with said middle priority class to control said industrial robot, and to employ data packets having a destination address with said highest priority class to exchange information between said industrial robot and said additional industrial robot.

26. A system as claimed in claim 25 wherein said computer is configured to process data packets having said destination address with said highest priority class in real time.

27. A system as claimed in claim 17 wherein said computer is configured to assign a respective destination address to a respective interface to establish the destination address for a data packet at the time the data packet is received by that respective interface.

28. A system as claimed in claim 17 comprising respective memories respectively assigned to the interfaces, in which the received data packets are buffered.

29. A system as claimed in claim 28 wherein said computer is configured to discard a data packet received by a first interface among said plurality of interfaces when the respective memory associated with the first interface is full and a data packet that was received by a second interface, among said plurality of interfaces, and is still to be processed or still to be received, with the priority class of the first interface being less than the priority class of the second interface.

30. A system as claimed in claim 17 wherein said plurality of interfaces are formed from the group consisting of virtual interface divisions of one interface, and physically separate interfaces.

31. A system as claimed in claim 17 wherein said plurality of interfaces are formed by dividing one interface into three interface divisions respectively assigned three different priority classes, said three different priority classes being defined as a lowest priority class, a middle priority class, and a highest priority class, and wherein said interface is configured to receive data packets at a first of said interface divisions with said lowest priority class for data archiving, configuring said computer, and diagnosing said computer, and to receive data packets at a second of said interface divisions with the middle priority class for controlling said industrial robot, and to receive data packets at a third of said interface divisions with the highest priority for information exchange between said industrial robot and said additional industrial robot.

32. A system as claimed in claim 31 wherein said computer is configured to process data packets received by said interface division with the highest priority class in real time.

33. An industrial robot system comprising:
a robot comprising a plurality of robot arms respectively articulated at multiple axes and being movable relative to each other with respect to said axes;
a computer system connected to said robot configured to perform a plurality of tasks associated with operation of said robot;
said computer system having a plurality of respective interfaces and being configured to assign each respective interface a priority level, from among a plurality of priority levels ranked from a lowest priority level to a highest priority level in a hierarchy of time-criticality for performing respective tasks among said plurality of tasks, with the lowest priority level in said hierarchy designating a task, among said plurality of tasks, with a lowest time-criticality for performance thereof and the highest priority level designating a task, among said plurality of tasks, with a highest time-criticality for performance thereof;
the respective interfaces being configured to individually receive incoming data packets that originate externally of said computer system, and to automatically assign each incoming data packet a priority level equal to the priority level of the respective interface at which that incoming data packet was received;
said computer system, via the respective interfaces, being configured to give each incoming data packet a destination address that causes that data packet to be transferred to a destination in said computer system designated by the destination address; and
said computer system being configured to process the respective data packets at said respective destinations in said computer system in a chronological order that is dependent on the respective destination to which the respective data packets have been transferred.

* * * * *